United States Patent Office 2,745,555
Patented May 15, 1956

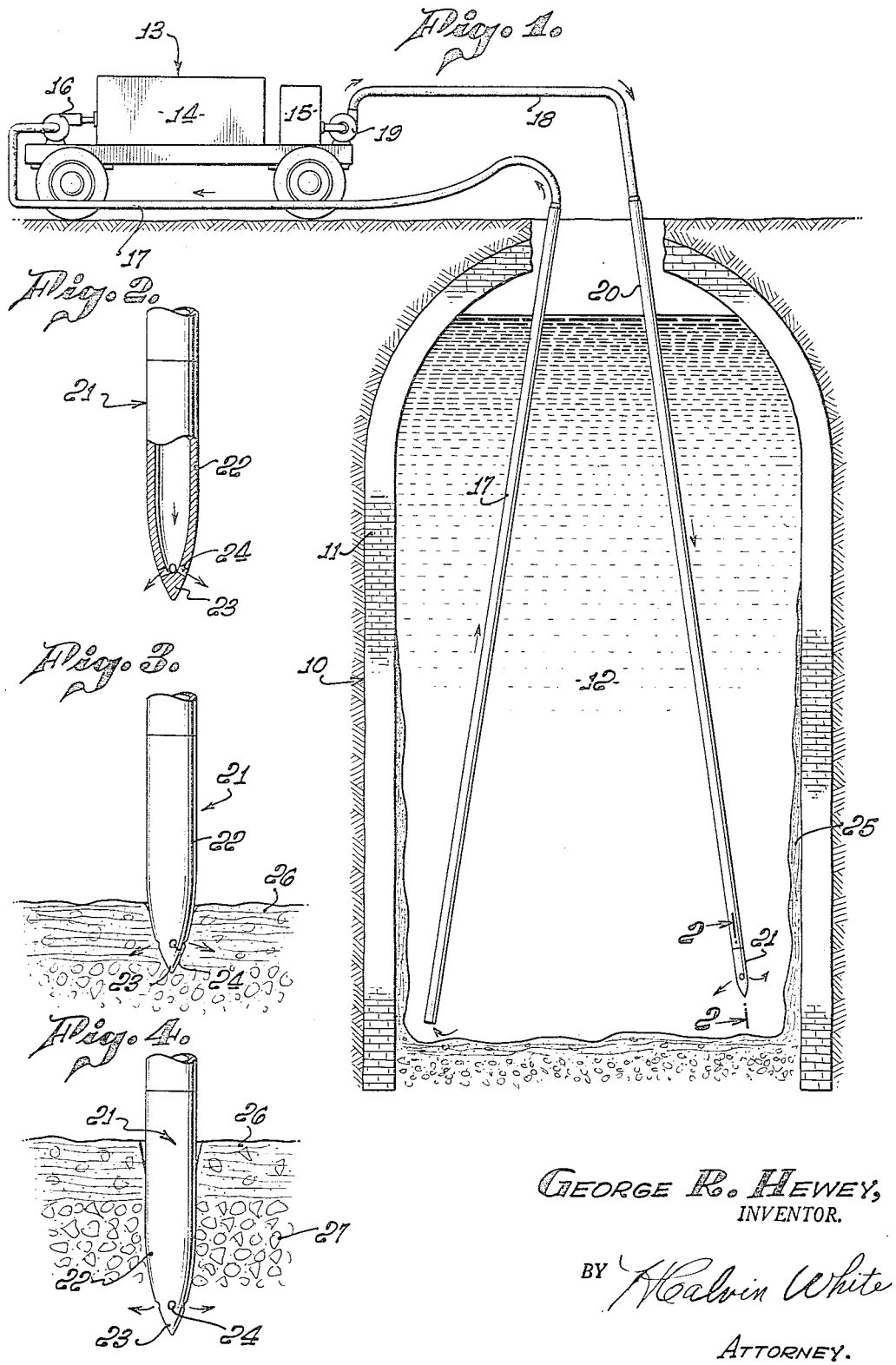

2,745,555

METHOD FOR CLEANING CESSPOOLS

George R. Hewey, Mentone, Calif.

Application March 3, 1952, Serial No. 274,550

4 Claims. (Cl. 210—207)

This invention has to do with the treatment of cesspools and septic tanks for the purposes of removing clogging organic accumulations not only directly from within the cesspool chamber itself, but also from the porous formation or gravel region generally at the bottom of and below the chamber.

Cesspools ordinarily are located in the ground to the depth of a sand or gravel formation having such porosity as to pass fluids flowing from the cesspool chamber proper. In the course of time the cesspool accumulates clogging deposits of a dense organic nature having limited water solubility and comprising largely, it is believed, humates lignins, cellulose, complex nitrogenous and other similar organic compounds and complexes. These accumulations develop on the side walls of the chamber as well as in the form of a dense and eventually impermeable layer in the bottom of the chamber, and also within the interstitial spaces of the porous formation below. Restoration of a clogged cesspool to efficient operating condition requires removal of at least the bulk of all such deposits.

The invention contemplates generally a treatment of the clogging accumulations on the walls and bottom of the chamber, initially to precondition the chamber in a manner which will permit effective completion of the entire cleaning operation, and then a further and final treatment which will free the gravel or other loose formation below the chamber, for open fluid drainage after the cesspool is restored to service. As will appear, the initial treatment given the chamber involves the use of a detergent solution so applied to the deposits on the walls and bottom of the chamber as to assure effective loosening and dispersion of the solids in the body of water in the chamber for removal to the ground surface. After removal of such deposits, including bottom accumulations to the depth of the underlying gravel, I then employ a special process for clearing the interstitial spaces of the gravel, by using a treating reagent having what appears to be a base exchange reaction with organic and inorganic materials to be removed. In this connection, it appears that dispersion-resistant organic residues of a humate and lignitic nature, normally develop as very dense and difficultly soluble or dispersible materials which cannot be removed by the ordinary practices of merely pumping out or flushing the chamber. One of my particular objects in this respect is to effect a base exchange reaction between an ammoniacal reagent and such residues and other organic complexes, which will result in conversion of the deposits to a more soluble or dispersible form, capable of being flushed or displaced out of the gravel, or of being so carried and distributed within the outlying formation.

After the water-filled cesspool is opened, the chamber walls are treated with an aqueous detergent which term as herein used will be understood to include any non-soap detergent of the class consisting of alkyl aryl sulfonates (e. g. sodium alkyl benzene sulfonates), alkyl sulfonates or sulfates (e. g. sodium lauryl sulfate), alkyl hydrogen sulfates, sulfated monoglycerides, sulfated alkylalamides of fatty acids, and sulfated esters, all of which contain a long chain alkyl group. An aqueous solution containing for example up to ½% of the detergent may contain also any of the usual fillers or builders such as sodium sulfate and polyphosphates. By the later described method of introducing a high velocity stream of the detergent to a mechanically penetrated depth of the deposit layer, the detergent solution is found to remove and disperse the organic material at high efficiency.

The same general technique is employed in removing the organic deposits from and below the bottom of the chamber, in that outstanding results have been had by following the penetration removal of the accumulations on the bottom of the chamber, by mechanical penetration of the gravel below and introduction of ammonia reagent at high velocity at the depth of penetration. Preferably the gravel clearing reagent comprises an aqueous solution of ammonium hydroxide (e. g. 1 gallon of ammonium hydroxide to 300 gallons of water), which by a base exchange effect tends to readily disperse the insoluble iron, aluminum and silica humate and other organic complexes apparently present. While gaseous ammonia may be introduced to the gravel interstices as the treating reagent, it is generally preferred to use the hydroxide solution. At this point it may be mentioned that following the gravel cleaning treatment, subsequent clogging of the gravel after the cesspool is restored to service may be inhibited or delayed by depositing on or within the cleared gravel an ammonia salt, such as ammonium chloride, which tends to serve as a leaching agent.

The features and objects referred to in the foregoing as well as the details of a typical procedure for practicing the invention, will be further understood from the following detailed description of the accompanying drawing, in which:

Fig. 1 is a general view showing the opened cesspool in cross section;

Fig. 2 is an enlarged part sectional view of the nozzle taken on line 2—2 of Fig. 1; and Figs. 3 and 4 are views illustrating the use of the nozzle in penetrating and introducing the reagents to the media being treated.

First it may be assumed that the clogged cesspool 10 having a usual brick-lined side wall 11 and a water filled chamber 12, is opened at the top for servicing by suitable pumping equipment generally indicated at 13. Typically this equipment may include a pair of vehicle-carried tanks 14 and 15 the former of which receives liquid drawn from chamber 12 by pump 16 and suitable pipe or hose lines 17. Chamber 15 contains the treating solutions, and initially for example about a ½% aqueous solution of the above mentioned detergent together with any desired builders such as salt cake or a polyphosphate. The detergent solution is delivered from tank 15 through line 18 and pump 19 to an elongated pipe 20 carrying at its lower end a nozzle 21, the details of which are particularly illustrated in Fig. 2. The nozzle may comprise a tubular body 22 having a tapered end 23 containing at distances spaced from its pointed tip a plurality of openings 24 which may be inclined as illustrated to direct the liquid streams outwardly and forwardly of the nozzle tip. The latter thus may engage and to an extent penetrate the material to be dispersed, before the openings are forced into and thereby possibly clogged by the material.

As illustrated the clogged chamber wall and bottom ordinarily will carry coatings 25 and 26 of compact and difficultly soluble or dispersible material which in an ordinary clearing or flushing operation involving only removal of the liquid and readily dispersed substances from the chamber (as only general agitation and removal of the liquid will accomplish), is disturbed only to a minor degree. In accordance with the invention, suction withdrawal of the chamber liquid is started through pipe 17, and pipe 20 is manually manipulated to cause its tip 23 to penetrate different locations in the layer 25. Simultaneously, high velocity streams of the detergent are discharged into the layer below its surface, through passages 24 and in a manner such that the combined effects of the velocity and detergency of the streams effectively loosen and disperse the layer material in the body of liquid being taken from the chamber. Following removal of layer 25 the same procedure is followed in removing the bottom layer 26, i. e., by penetration with the nozzle 22, see Fig. 3, and introducing the reagent to loosen and disperse the material upwardly into the liquid.

Following the described removal of the layers 25 and 26, the treatment is continued to remove clogging accumulations from the interstitial spaces within the gravel or other porous drainage formation 27 below the chamber. For this purpose the reagent is changed to the ammonium hydroxide solution, alone or with some detergent. Penetration of the nozzle 21 into the gravel is effected at different locations so distributed as to assure effective clearing of the drainage area.

In the application of the nozzle to all the materials and media treated, it is found that any initial resistance to penetration may be overcome by applying pressure to the nozzle tip, the effect of which, together with the jetted fluid streams, is to cause a progressive penetration of the nozzle to the depth desired.

It is found that an ammonium hydroxide treatment may advantageously be given the side and bottom wall surfaces of the chamber 12 after removal of the deposits using the detergent solution as previously explained. Application to wall surfaces of an ammonium hydroxide reagent favors final removal of residues, particularly of a greasy nature, and may be made after initial removal of the chamber wall deposits and before introduction of the ammonium hydroxide solution to the gravel bed, or following final displacements of the clogging accumulations from the gravel.

I claim:

1. The method of treating a water-containing cesspool chamber and porous gravel formation below the chamber to remove dense organic deposits from the side walls of the chamber and similar deposits on the chamber bottom and within the gravel formation below, that includes applying to said side wall deposits an aqueous solution of an organic detergent to remove and disperse the deposits in the body of water in the chamber, and as a separate step penetrating below the surface of the deposit on the chamber bottom into said porous formation and projecting at the penetration depth a high velocity fluid stream containing ammonium hydroxide and acting to disperse the organic deposits and open the formation for fluid flow into the outlying formation.

2. The method of treating a water-containing cesspool chamber and porous gravel formation below the chamber to remove dense organic deposits from the side walls of the chamber and similar deposits on the chamber bottom and within the gravel formation below, that includes applying to said side wall deposits an aqueous solution of an organic detergent to remove and disperse the deposits in the body of water in the chamber, and as a separate step penetrating and introducing within said formation a high velocity ammonia-containing fluid stream acting to displace the organic deposits therefrom and open the formation for fluid flow into the outlying formation.

3. The method of treating a water-containing cesspool chamber and porous gravel formation below the chamber to remove dense organic deposits from the side walls of the chamber and similar deposits on the chamber bottom and within the gravel formation below, that includes applying to said side wall deposits an aqueous solution of an organic detergent to remove and disperse the deposits in the body of water in the chamber, and as a separate step penetrating below the surface of the deposit on the chamber bottom into said porous formation and projecting at the penetration depth a high velocity aqueous ammonia stream tending to disperse and carry the organic deposits downwardly into the porous formation below and open the formation for fluid flow into the outlying formation.

4. The method of treating a water-containing cesspool chamber and porous gravel formation below the chamber to remove dense organic deposits from the side walls of the chamber and similar deposits on the chamber bottom and within the gravel formation below while simultaneously withdrawing water from the chamber, that includes applying to said side wall deposits a high velocity localized stream of an aqueous solution of an organic detergent to remove and disperse the deposits in the body of water in the chamber, while simultaneously withdrawing water from the chamber, then as a separate step penetrating and introducing within said deposit on the chamber bottom an aqueous solution of said detergent in a high velocity localized stream acting to disperse the deposit, and then penetrating and introducing within said porous formation a high velocity aqueous ammonia stream acting to disperse the organic deposit therein and open the formation for fluid flow into the outlying formation.

References Cited in the file of this patent

UNITED STATES PATENTS

| | | |
|---|---|---|
| 168,477 | Gillespie | Oct. 5, 1875 |
| 294,727 | Ewing | Mar. 4, 1884 |
| 583,431 | Ennis | May 25, 1897 |
| 949,567 | Flanegin | Feb. 15, 1910 |
| 1,260,241 | Minton | Mar. 19, 1918 |
| 1,437,007 | Otterson | Nov. 28, 1922 |
| 1,561,744 | Raymond | Nov. 17, 1925 |
| 2,196,985 | Flett | Apr. 16, 1940 |
| 2,288,857 | Subkow | July 7, 1942 |
| 2,387,572 | Flett | Oct. 23, 1945 |
| 2,477,318 | Stevenson | July 26, 1949 |
| 2,477,671 | Warburton | Aug. 2, 1949 |
| 2,491,516 | Piggot et al. | Dec. 20, 1949 |